United States Patent
Adamini et al.

(10) Patent No.: US 6,547,277 B1
(45) Date of Patent: Apr. 15, 2003

(54) TWO CHAMBER GAS GENERATOR

(75) Inventors: Chris A. Adamini, Sterling Heights, MI (US); Robert M. Krupp, Royal Oak, MI (US)

(73) Assignee: Automotive Systems Laboratory, Inc., Farmington Hills, MI (US)

( * ) Notice: Subject to any disclaimer, the term of this patent is extended or adjusted under 35 U.S.C. 154(b) by 0 days.

(21) Appl. No.: 09/513,256

(22) Filed: Feb. 24, 2000

Related U.S. Application Data
(60) Provisional application No. 60/121,912, filed on Feb. 26, 1999.

(51) Int. Cl.[7] .............................................. B60R 21/26
(52) U.S. Cl. ..................... 280/741; 280/736; 102/530
(58) Field of Search ................ 280/735, 736, 280/741, 742, 737; 102/531, 202, 530; 29/435, 508, 515

(56) References Cited

U.S. PATENT DOCUMENTS

| | | | | | |
|---|---|---|---|---|---|
| 2,891,525 A | * | 6/1959 | Moore | .................... | 123/90.51 |
| 4,001,750 A | * | 1/1977 | Scherer et al. | ............... | 337/280 |
| 4,215,631 A | * | 8/1980 | Rucker | ......................... | 102/27 |
| 4,530,516 A | * | 7/1985 | Adams et al. | ............... | 280/741 |
| 4,611,374 A | * | 9/1986 | Schnelle et al. | .......... | 29/890.13 |
| 4,730,558 A | * | 3/1988 | Florin et al. | ................. | 102/218 |
| 4,762,067 A | * | 8/1988 | Barker et al. | ............... | 102/313 |
| 4,950,458 A | * | 8/1990 | Cunningham | ............... | 422/164 |
| 5,372,449 A | * | 12/1994 | Bauer et al. | ................. | 403/273 |
| 5,564,743 A | * | 10/1996 | Marchant | ..................... | 280/741 |
| 5,611,566 A | | 3/1997 | Simon et al. | ................ | 280/736 |
| 5,622,380 A | * | 4/1997 | Khandhadia et al. | ........ | 280/736 |
| 5,628,528 A | * | 5/1997 | DeSautelle et al. | ......... | 280/736 |
| 5,630,619 A | * | 5/1997 | Buchanan et al. | .......... | 280/741 |
| 5,799,973 A | | 9/1998 | Bauer et al. | ................. | 280/741 |
| 5,934,705 A | | 8/1999 | Siddiqui et al. | ............ | 280/736 |
| 5,941,562 A | * | 8/1999 | Rink et al. | ................... | 280/741 |
| 6,019,389 A | * | 2/2000 | Burgi et al. | ................. | 280/736 |
| 6,032,979 A | * | 3/2000 | Mossi et al. | ................. | 280/741 |
| 6,095,556 A | * | 8/2000 | Bailey et al. | ............... | 280/737 |
| 6,095,561 A | * | 8/2000 | Siddiqui et al. | ............ | 280/742 |
| 6,149,193 A | * | 11/2000 | Canterberry et al. | ........ | 280/741 |
| 6,244,623 B1 | * | 6/2001 | Moore et al. | ............... | 280/741 |
| 6,464,254 B2 | * | 10/2002 | Chikaraishi et al. | ........ | 280/741 |

FOREIGN PATENT DOCUMENTS

DE  42 27 547 A1  2/1994

OTHER PUBLICATIONS

WO 98/39183; Title: Multi–Chamber Inflator; International Publication Date: Sep. 11, 1908; Inventors: Shahid A. Siddiqui and Rickey Lee Stratton; Applicant: Automotive Systems Laboratory, Inc.

\* cited by examiner

*Primary Examiner*—Brian L. Johnson
*Assistant Examiner*—Christopher Bottorff
(74) *Attorney, Agent, or Firm*—Dinnin & Dunn, P.C.

(57) ABSTRACT

A gas generator utilizes a housing having two combustion chambers defined by a partition disposed intermediate the ends of the housing and retained by a pair of crimps disposed on opposite sides of the partition, respectively.

2 Claims, 1 Drawing Sheet

TWO CHAMBER GAS GENERATOR

CROSS-REFERENCE TO RELATED APPLICATION

This application is based on provisional application Ser. No. 60/121,912 filed on Feb. 26, 1999.

BACKGROUND OF THE INVENTION

The present invention relates to gas generators used to inflate air bags in an automobile occupant protection system and, more particularly, to an improved dual chamber gas generator wherein structural integrity of each chamber is assured by a novel dual crimp.

Inflation systems for deploying an air bag in a motor vehicle generally employ a single gas generator in fluid communication with an uninflated air bag. The gas generator is typically triggered by a firing circuit when the sensed vehicle acceleration exceeds a predetermined threshold value, as through the use of an acceleration-responsive inertial switch.

However, air bag inflation systems utilizing a single gas generator suffer from the disadvantage that the onset pressurization/inflation rate is generally set to provide aggressive initial inflation in order to achieve a particular inflation time related to occupant position. An aggressive onset rate of pressurization becomes problematic in situations where the occupant is out of position. More specifically, rapid onset pressurization of the air bag can cause the air bag to impact against the occupant with enough force to injure the occupant. The airbag volume and inflating capacity are designed to protect both large and small occupants and are generally not variable within the single gas generator. Occasionally, when an air bag utilizing a single gas generator is deployed, smaller occupants, usually children and smaller women, have been seriously injured.

Commonly owned U.S. Pat. No. 5,400,487 discloses an inflation system which overcomes the above problem by utilizing a plurality of gas generators which are controllably ignited to provide a variable inflation profile which can be tailored to any given occupant weight and/or position and for any crash type. While this arrangement dramatically improves the inflation system's ability to protect an occupant, it does so at significant expense and complexity. The multiple gas generators and squibs add considerable cost to the system, while the firing control circuitry requires sophisticated processors capable of accurately timing the various ignition profiles.

Another proposal, as taught in commonly owned U.S. Pat. No. 5,934,705, is a gas generator having two chambers in a single housing defined by a mechanically retained wall between the ends thereof. Each housing is of a predetermined size that is determinative of the propellant capacity and consequently, of the inflating capability of each chamber. Upon the occurrence of a vehicle collision, depending on the weight of the passenger, either chamber or both may be selectively ignited thereby inflating the protective airbag. However, the structural integrity of such a known dual chamber inflator, may be compromised by failure of the wall separating the chambers when only one chamber is fired.

Therefore, a need exists for a dual chamber gas generator which can produce selective air bag inflation pressurization yet prevent hazardous structural failure of the gas generator.

SUMMARY OF THE INVENTION

In accordance with the present invention a gas generator comprises two combustion chambers formed within a single housing. Each chamber may be tailored to meet a desired inflation pressure thereby providing selective inflation pressurization. A partition is disposed within the housing to define the two chambers and is positively retained by a dual crimp in the inflator housing to insure the structural integrity of the chambers. Flame propagation from one chamber to the other is precluded thereby preventing inadvertent ignition of a chamber not activated by the vehicle acceleration sensing system.

The present invention will be more fully understood upon reading the following detailed description of the preferred embodiment in conjunction with the accompanying drawings.

DETAILED DESCRIPTION OF THE PREFERRED EMBODIMENT(S)

Figure 1:
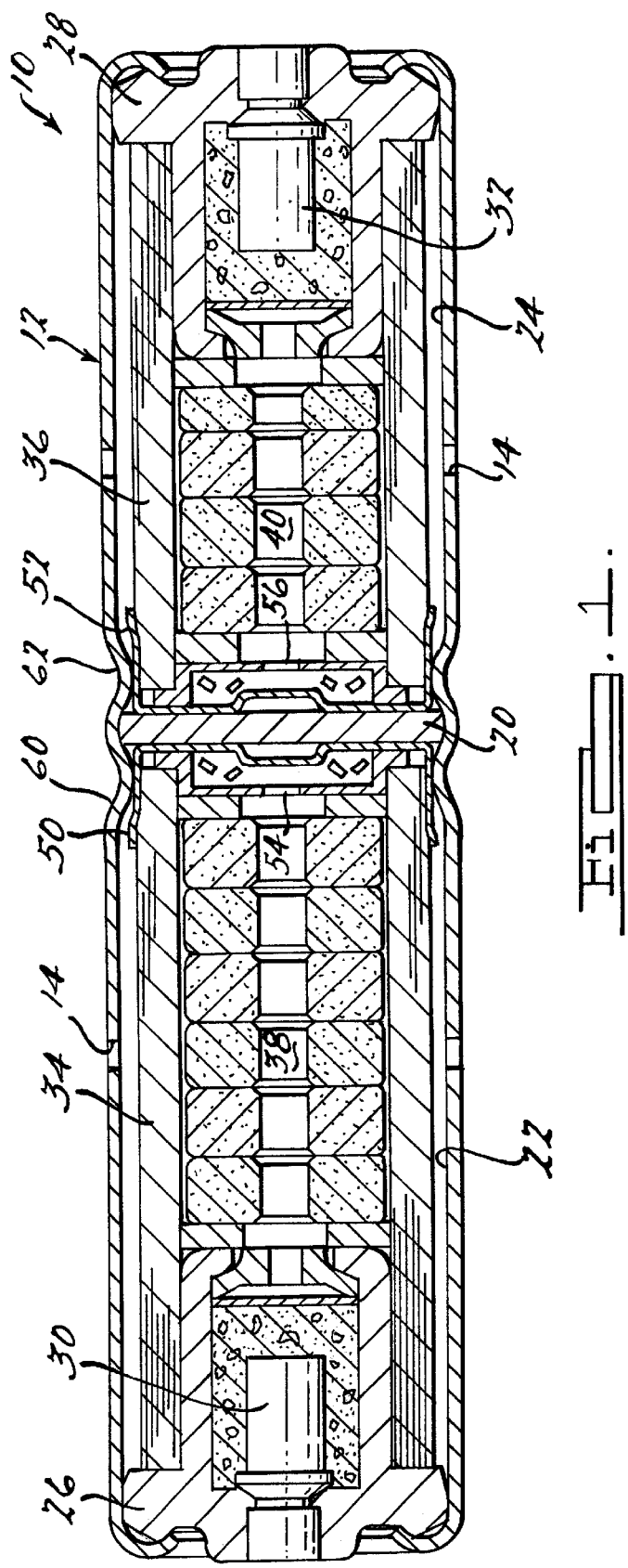
FIG. 1 is a longitudinal cross-sectional view of a gas generator having two propellant chambers defined and separated by a partition that is retained in accordance with the present invention.

As seen in FIG. 1 of the drawings, a dual chamber gas generator 10 having particular utility for use in, for example, an automobile occupant restraint system, comprises a cylindrical housing 12 having a plurality of gas discharge apertures 14 therein. A partition 20 is disposed within housing 12 intermediate the ends thereof, thereby defining first and second inflator chambers 22 and 24, respectively.

Endcaps 26 and 28 at opposite ends of the housing 12 close the chambers 22 and 24, respectively, and support separate ignitors 30 and 32, respectively. Filter assemblies 34 and 36 extend longitudinally within the chambers 22 and 24, respectively, for the support of propellant grains 38 and 40, respectively. A pair of filter retainer clips 50 and 52 are disposed on opposite sides of the partition 20. Pre-ignition propellant containers 54 and 56 are disposed adjacent the clips 50 and 52, respectively.

In accordance with the present invention, the partition 20 is retained in position by dual annular crimps 60 and 62 so as to positively preclude a flame front from passing from one chamber to another. The partition 20 is preferably formed from metal or ceramic and is orientated in plane perpendicular to the longitudinal axis of housing 12. The propellant capacity of each chamber 22 and 24 can be easily tailored by simply sliding the partition 20 to a desired position intermediate the ends of housing 12. Once partition 20 is in position, housing 12 is roll formed on opposite sides of the partition 20 to fixedly position the partition 20 and to provide sealing between the chambers 22 and 24. The remaining components are then installed as described above.

In operation, either chamber 22 or 24, or both, are selectively ignited depending on the input from the vehicle crash sensing system. Combustion gas flows radially outwardly from either propellant chamber 22 or 24, through filter 34 or 36 thence exiting the inflator 10 through the apertures 14 in the housing 12. Exclusive operation of either chamber is ensured by positively supporting the partition 20 by a crimp on the opposite side of the partition from the pressurized chamber. Therefore, the full longitudinal thickness of the partition is utilized, in compression, to maximize the structural integrity thereof, and to insure positive sealing.

It will be understood that the foregoing description of the preferred embodiment of the present invention is for illustrative purposes only, and that the various structural and operational features herein disclosed are susceptible to a number of modifications, none of which departs from the spirit and scope of the present invention as defined in the appended claims.

We claim:

1. A gas generator for a vehicle occupant protection system comprising:

an elongated cylindrical housing;

a pair of end closures at opposite ends of said housing, respectively;

a radially extending imperforate partition in said housing intermediate the ends thereof defining a pair of discrete propellant combustion chambers; and a pair of annular crimps in said housing on opposite sides, respectively, of said partition whereby combustion pressure in one of said propellant chambers biases the partition against the crimp on the opposite side thereof to maximize sealing therebetween.

2. A gas generator for a vehicle occupant protection system comprising:

an elongated cylindrical housing having a given circumference;

a pair of end closures at opposite ends of said housing, respectively;

a radially extending imperforate partition in said housing intermediate the ends thereof defining a pair of discrete propellant chambers; and a pair of annular crimps coextensive with said circumference and in said housing on opposite sides, respectively, of said partition whereby combustion pressure in one of said propellant chambers biases the partition against the crimp on the opposite side thereof to maximize sealing therebetween.

* * * * *

UNITED STATES PATENT AND TRADEMARK OFFICE
CERTIFICATE OF CORRECTION

PATENT NO.     : 6,547,277 B1
DATED          : April 15, 2003
INVENTOR(S)    : Chris A. Adamini et al.

It is certified that error appears in the above-identified patent and that said Letters Patent is hereby corrected as shown below:

<u>Title page,</u>
Item [56], OTHER PUBLICATIONS, please delete "1908" and insert -- 1998 --

Signed and Sealed this

Thirtieth Day of December, 2003

JAMES E. ROGAN
*Director of the United States Patent and Trademark Office*